US006431784B1

(12) United States Patent
Kronenberg

(10) Patent No.: US 6,431,784 B1
(45) Date of Patent: Aug. 13, 2002

(54) PLUG-IN CONNECTOR

(76) Inventor: Max Kronenberg, Bünkenberg 2, D-42657, Solingen (DE)

(*) Notice: Subject to any disclaimer, the term of this patent is extended or adjusted under 35 U.S.C. 154(b) by 0 days.

(21) Appl. No.: 09/584,833

(22) Filed: May 31, 2000

(30) Foreign Application Priority Data

Jun. 1, 1999 (DE) ..................................... 299 09 413 U

(51) Int. Cl.[7] ................................................ F16B 39/22

(52) U.S. Cl. ........................ 403/297; 403/298; 403/292

(58) Field of Search ................................ 403/298, 292, 403/295, 297, 288, 408.1, 267, 375; 52/726.1

(56) References Cited

U.S. PATENT DOCUMENTS 2,001,144 A * 5/1935 Krnansky ................... 403/292
2,850,304 A * 9/1958 Wagner .................. 403/297 X
3,484,830 A * 12/1969 Wagner et al. .......... 403/297 X
5,209,599 A * 5/1993 Kronenberg ................ 403/298
5,560,731 A * 10/1996 Kronenberg ................ 403/298
5,642,957 A * 7/1997 Lange ........................ 403/297

FOREIGN PATENT DOCUMENTS

| | | |
|---|---|---|
| DE | 92 09 382.5 | 5/1993 |
| DE | 296 13 519 U1 | 12/1997 |
| EP | 04 68 166 A1 | 1/1992 |
| EP | WO 99 13 192 A1 | 9/1998 |

* cited by examiner

*Primary Examiner*—Lynne H. Browne
*Assistant Examiner*—John Cottingham
(74) *Attorney, Agent, or Firm*—McGlew and Tuttle, P.C

(57) ABSTRACT

A plug-in connector for hollow sections of spacer frames for insulating glass panes is provided with at least two connector parts with an essentially U-shaped cross section and having an outside depression in the area of the connection point of the hollow sections. One connector part has a lateral indentation in an area of the connection point at least on one side. This indentation is set back in relation to the adjacent side wall of the other connector part.

18 Claims, 3 Drawing Sheets

Fig. 9
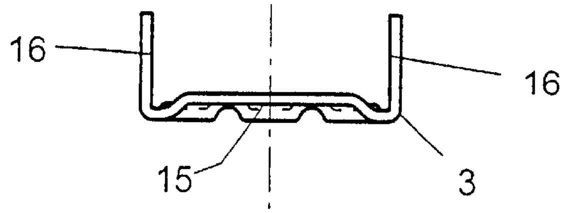
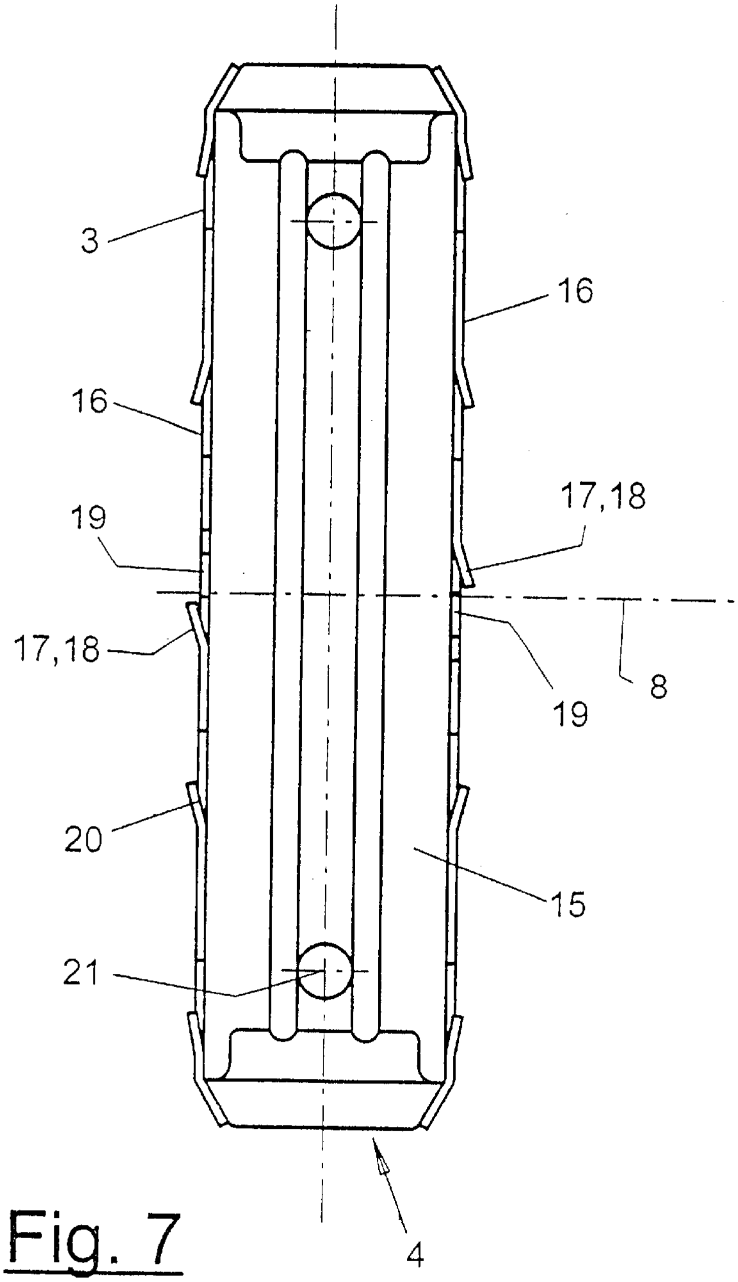
Fig. 7
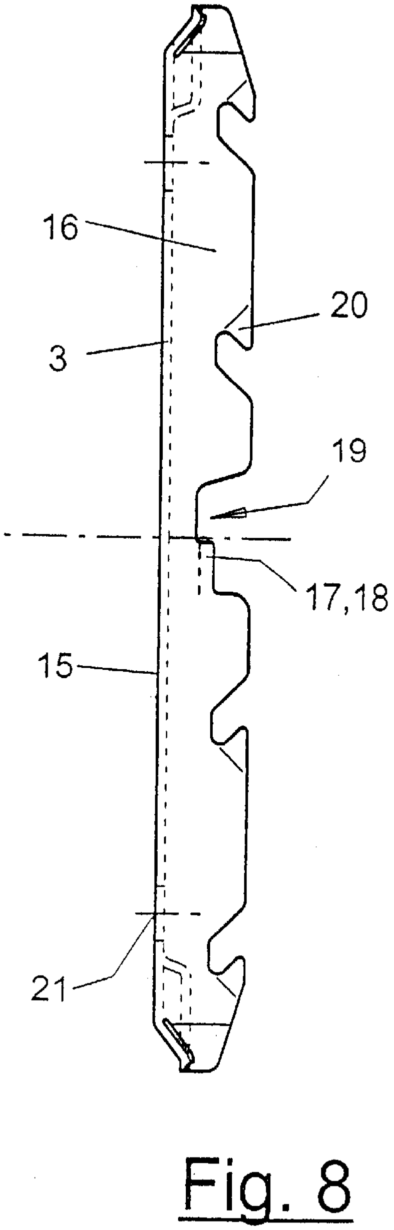
Fig. 8

PLUG-IN CONNECTOR

FIELD OF THE INVENTION

The present invention pertains to a plug-in connector for hollow sections of spacer frames for insulating glass panes, wherein the plug-in connector comprises at least two connector parts with an essentially U-shaped cross section and has an outside depression in the area of the connection point of the hollow sections.

BACKGROUND OF THE INVENTION

Such a plug-in connector has been known from DE-U 92 09 382. It comprises two parts with a U-shaped cross section, which can be fitted together at right angles to the longitudinal axis of the connector. In the area of the connection point of the hollow sections, one connector part has an outside depression on its middle wall, which acts as a space for accommodating a sealant.

SUMMARY AND OBJECTS OF THE INVENTION

The object of the present invention is to improve the prior-art plug-in connector.

According to the invention, a plug-in connector for hollow sections of spacer frames for insulating glass panes is provided with at least two connector parts with an essentially U-shaped cross section and having an outside depression in the area of the connection point of the hollow sections. One connector part has a lateral indentation in an area of the connection point at least on one side. This indentation is set back in relation to the adjacent side wall of the other connector part.

The lateral indentations of one connector part have the advantage that they provide additional space for receiving the sealant at the connection point of the hollow sections. As a result, the sealant can extend at the connection point over three sides of the plug-in connector and offer an all-round sealing. In addition, the sealant located in the indentations prevents a granulated desiccant that may possibly be present inside the plug-in connector from escaping at the connection point of the hollow sections.

The indentations are limited at both ends by projections at the side walls of one connector part. The projections are tightly in contact with the side walls of the other connector part and prevent the viscous or pasty sealant from flowing farther. The sealant receives a limited and defined accommodating space, which also makes possible the accurate metering of the sealant.

A further enlargement of the space accommodating the sealant at the connection point is possible due to recesses at the edges of the side walls of the other connector part. These recesses can be designed and placed especially favorably if middle stops acting in one direction are present. Via the recesses, the sealant in the area of the recesses can penetrate up to the inner wall of the attached hollow sections and thus optimally seal the connection point.

The plug-in connector is preferably manufactured as a stamped and bent part from metal, especially steel plate. This offers optimal stability in conjunction with a high dimensional stability and with advantages in terms of economy.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a partially cut-away top view of a two-part plug-in connector with an attached hollow section and sealing compound filled in.

FIG. 2 is a partially cut-away tilted side view of the two-part plug-in connector with an attached hollow section and sealing compound filled in;

FIG. 3 is a partially cut-away top front view of a two-part plug-in connector with an attached hollow section and sealing compound filled in;

FIG. 7 is a top view of the other lower connector part;

FIG. 8 is a tilted side view of the other lower connector part;

FIG. 9 is a front view of the other lower connector part.

DESCRIPTION OF THE PREFERRED EMBODIMENTS

Figure 3:
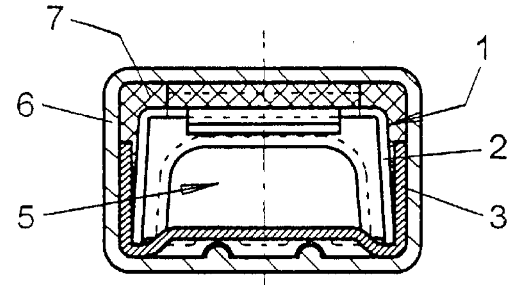
Figure 1:
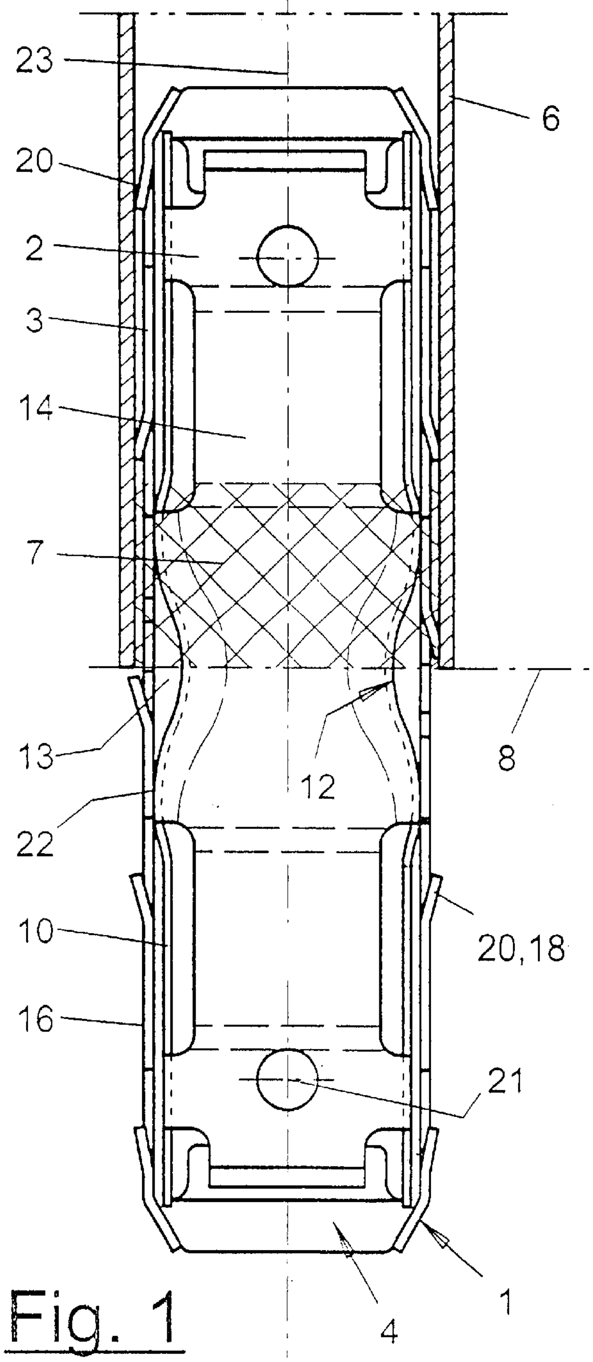
Figure 2:
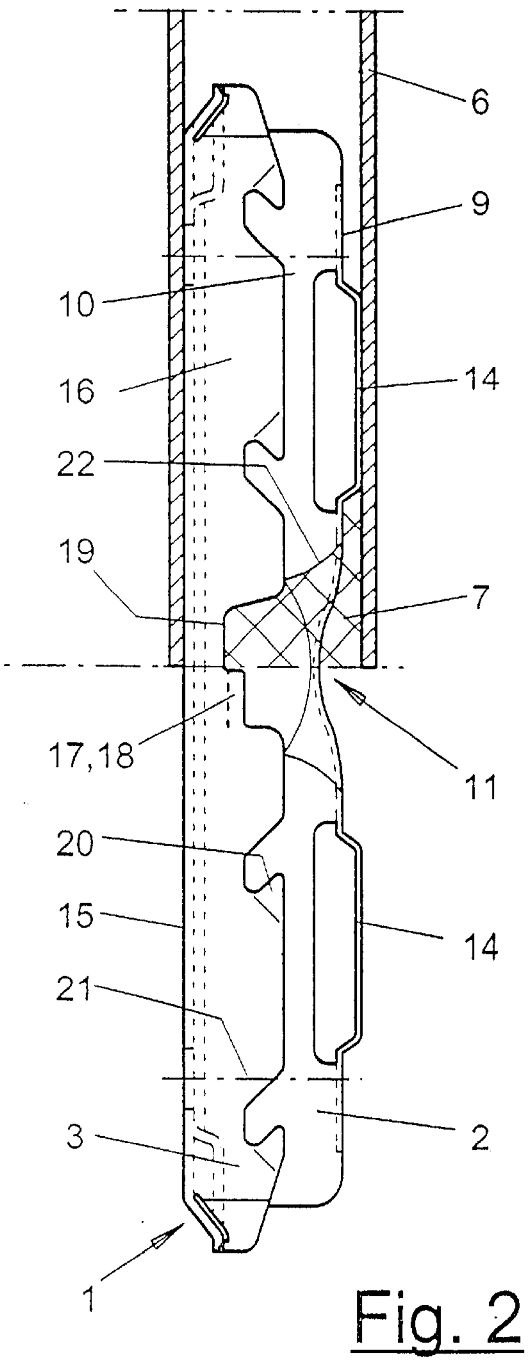
Figure 6:
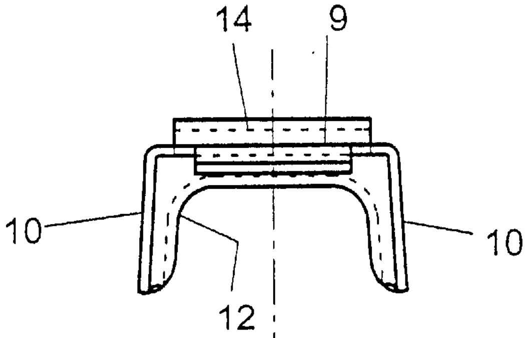
FIG. 6 is a front view of an upper connector part.
Figure 4:
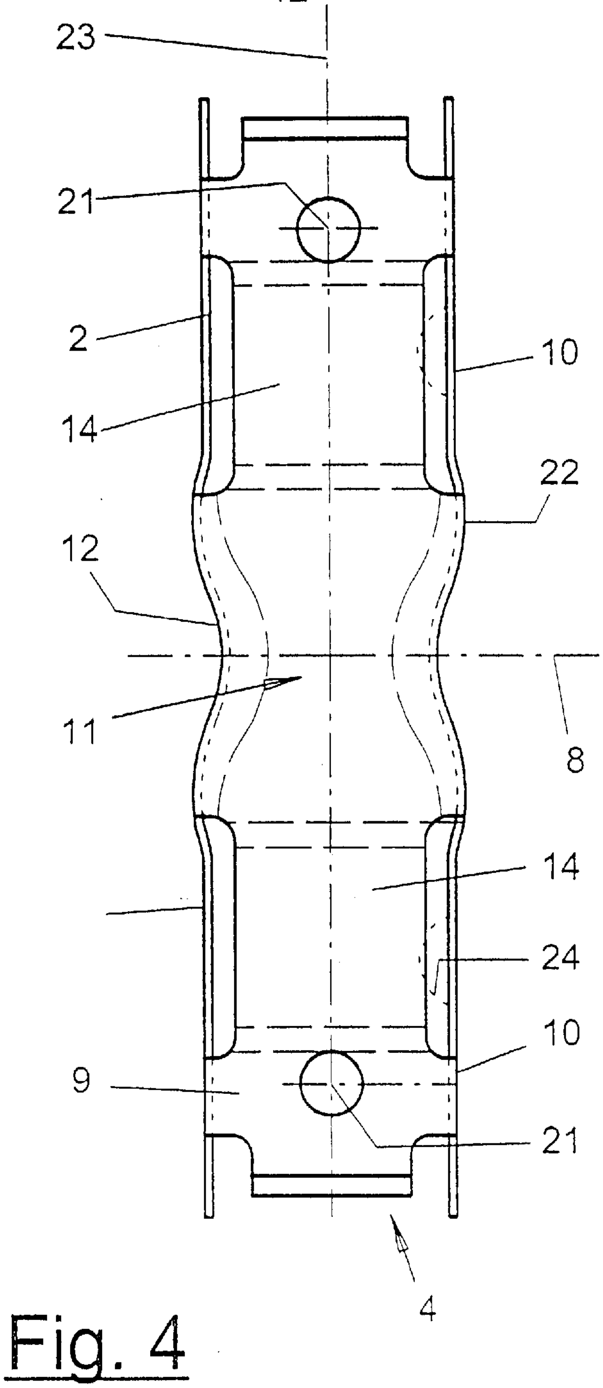
FIG. 4 is a top view of an upper connector part.
Figure 5:
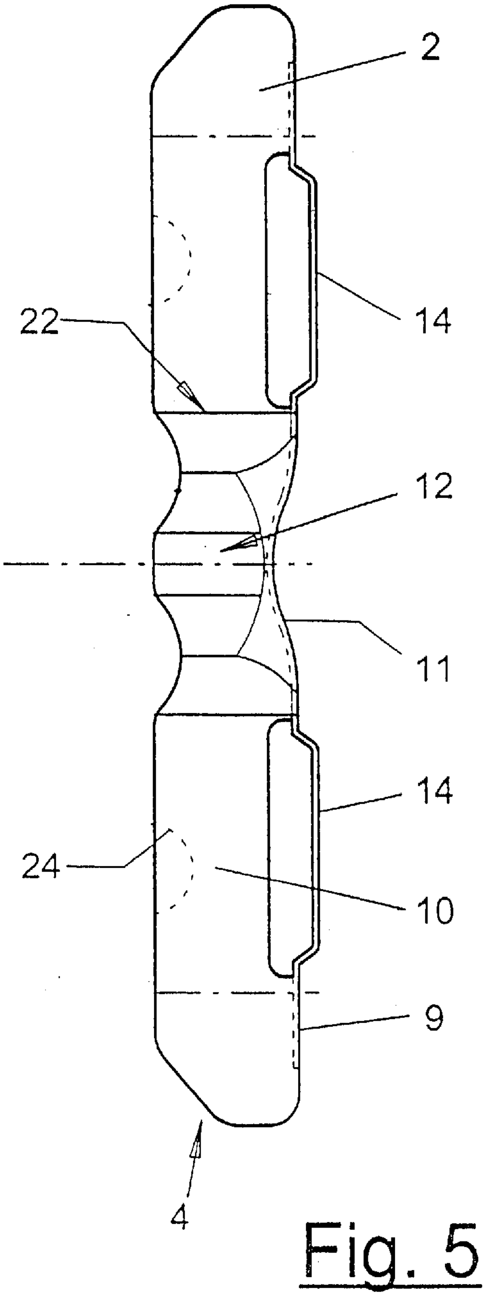
FIG. 5 is a tilted side view of an upper connector part.

Referring to the drawings in particular, FIGS. 1 through 9 show different views of a plug-in connector 1, which comprises two connector parts 2, 3. The plug-in connector 1 is intended for hollow sections 6 of spacer frames for insulating glass panes (not shown). FIGS. 1 through 3 show the plug-in connector 1 together with a hollow section 6 pushed over in half sections. The other hollow section is not shown for the sake of clarity.

The plug-in connector 1 is preferably arranged in the hollow sections 6 such that one connector part, the so-called top part 2, points toward the outside of the frame. The other connector part, the so-called lower part 3, is, in contrast, directed toward the inside of the frame and toward the interior space between the panes. On this inner side, the hollow sections 6 may also have longitudinally extending perforations at the bottom or inner wall, which are schematically represented by small elevations in FIG. 3, and corresponding grooves extend over them at the middle wall 15 of the lower part 3.

The hollow sections 6 pushed over the plug-in connector 1 on both sides meet at the connection point 8. This is preferably also the transverse central axis of the plug-in connector 1. The plug-in connector 1 otherwise also has a longitudinal axis 23. A viscous or pasty sealant 7, which penetrates into a free space 13 at the plug-in connector 1 and preferably sealingly surrounds the plug-in connector 1 on three sides, is filled at this connection point 8 into the hollow sections 6. The sealant 7 may consist of any suitable material, e.g., a butyl compound.

The plug-in connector 1 has an essentially box-like and closed cross section with an inner hollow space 5, which is axially accessible through preferably open front sides 4. The granulated desiccant not shown present in the hollow sections 6 can flow through the tubular plug-in connector 1 and move from one hollow section 6 into the other beyond the connection point 8. The desiccant outside the plug-in connector 1 can come into contact with the air or the gas in the interior space between the panes via the aforementioned perforations.

Both connector parts 2, 3 have an essentially U-shaped cross section. They are fitted together at right angles to the longitudinal axis 23 of the connector and are connected to one another in a clamping connection. The lower part 3 is preferably broader than the top part 2, so that the top part 2 can be fitted into the lower part 3. Both connector parts 2, 3 have a middle wall 9, 15 each and two bent side walls 10, 16 adjoining the said middle wall. The connector parts are shown individually in FIGS. 4 through 9.

The lower part 3 preferably has straight side walls 16 extending continuously along the longitudinal axis 23. It is adapted to the shape of the hollow section 6 and with its side walls 16 and the middle wall 15, it is at least extensively flatly and two-dimensionally in contact with the adjacent hollow section walls.

In the area of the connection point or the central axis 8, the upper part 2 has, preferably at both side walls 10, an indentation 12, which is set back in relation to the respective adjacent side wall 16 of the lower part 3. As is illustrated in FIG. 1, free spaces 13, into which the sealant 7 can penetrate from the outside of the hollow section, are created as a result on both sides between the side walls 10, 16.

At the axial ends of the indentations 12, the side walls 10 laterally protrude into projections 22, which are sealingly in contact with the adjacent side walls 16 of the lower part 3 and limit the lateral free spaces 13 as a result. Behind the projections 22, the side walls 10 of the upper part 2 can again be set back somewhat in the inwardly direction.

In addition, the upper part 2 has a depression 11 at its middle wall 9 at the connection point 8, as a result of which a free space for receiving sealant 7 is likewise formed between the outer wall of the hollow section 6 and the depression 11. FIG. 2 shows this arrangement. Via the depression 11 and the indentations 12, the sealant 7 can sealingly surround the plug-in connector 1 on three sides in the area of the connection point 8.

As is illustrated in FIGS. 2 and 4 through 6, the upper part 2 also has on both sides at its middle wall 9 an upwardly or outwardly projecting and preferably elastic hump 14 at axially spaced locations from the connection point 8, which said hump is sealingly in contact with the adjacent hollow section wall. Due to being elastically in contact, the humps 14 ensure tolerance compensation, on the one hand, and a firm joining together of the connector parts 2, 3, which are already held together by the clamping connection anyway. In addition, the humps 14 axially limit the free space formed by the depression 11 and prevent the sealant 7 from penetrating farther in the axial direction.

As is illustrated in FIGS. 3 and 7 through 9, the lower part 3 may have a recess or a cutout 19 each at its two side walls 16 in the area of the connection point 8. Due to the recess 19, the edge of the side walls 16 is set back save a small web. A free space 13, through which the sealant 11 at the connection point 8 can penetrate as close to the side walls of the hollow section 6 as possible, is additionally formed by the recesses 19.

At the central axis 8, the lower part 3 has two middle stops 17, which are preferably designed as laterally projecting spring bosses 18. They are arranged each at the free edge of a side wall 16 and act in one direction. As is illustrated in FIG. 7, the two middle stops 17 are directed toward each other and are set back somewhat axially from the central axis 8.

As is apparent from FIGS. 2 and 8, a recess 19 each is located axially opposite the two middle stops 17 at the same side wall 16. In addition, the middle stops 17 are likewise depressed in relation to the edges of the side walls 16, so that a recess, through which the sealant 7 can reach the side walls of the hollow section, is additionally formed here.

FIGS. 1 through 3 also show that the side walls 16 of the lower part 3 have a smaller height than the side walls 10 of the upper part 2. A lateral free space to the adjacent hollow section walls is additionally formed as a result for receiving sealant 7.

In practice, the sealant 7 is filled in during the assembly of the plug-in connector 1. The two hollow sections 6 are first pushed over the ends of the plug-in connector 1 on both sides, but only up to about the points at which the depression 11 begins. The sealant 7 is then injected in a suitable manner through the remaining gap from the outside of the hollow sections 6 or is filled in in another way. It surrounds the plug-in connector 1 and fills the above-described free spaces. The two hollow sections 6 are subsequently pushed together up to the junction point 8 and the middle stops 17. The plug-in connector 1 and the hollow sections 6 are then sealed at the junction point 8 by the sealant 7 in the interior space.

The side walls 10 of the upper part 2, which are straight in the end areas, are axially fixed by the side walls 16 of the lower part 3, which are bent obliquely inward at the ends. The clamping connection between the connector parts 2, 3 is achieved by means of the lateral projections 22. The side walls 10 of the upper part 2 may be additionally directed obliquely outwardly with a slight oversize, as a result of which they are elastically pressed to the transition flute between the middle wall 15 and the side walls 16 of the lower part 3 during the fitting together of the connector parts 2, 3. Furthermore, the side walls 10 of the upper part 2 may have a plurality of inwardly directed impressions 24, which are elastically clamped with the above-mentioned, elevated grooves at the middle wall 15. This arrangement is suggested in FIGS. 4 and 5.

A plurality of suitable retaining elements 20 may be used to hold the plug-in connector 1 in the attached hollow sections 6. These are, e.g., spring bosses at the free edges of the side walls 16 of the lower part 3, which spring bosses are cut free and project laterally. In addition, the humps 14 may act as retaining elements due to their frictional engagement with the hollow section wall.

The plug-in connector 1 and its connector parts 2, 3 are preferably made as stamped and bent parts made of metal, especially a pretreated and heat-treated steel plate. As an alternative, they may also consist of any other suitable material. Different material combinations or composite materials are also possible.

In the preferred stamped and bent part, the humps 14 at the upper part 2 are cut free and bent up. In addition, both connector parts 2, 3 may have at the ends centering holes 21, which are aligned in the connection position and by functioning as guides in conjunction with pins or conical indexes pushed through, they facilitate the mechanical fitting together of the connector parts 2, 3. In addition, the centering holes 21 are advantageous for the accurate and centrally symmetrical stamping and bending of the connector parts 2, 3 from the steel plate mill bars.

Various modifications of the embodiments shown are possible. On the one hand, the assignment of the connector parts 2, 3 may be reversed. On the other hand, the plug-in connector 1 may also have more than two connector parts 2, 3. Moreover, the shape and the mutual shape adaptation and assignment of the connector parts 2, 3 may be varied as desired. In another modification, the plug-in connector 1 may have closed front sides 4 and act as a stop for the desiccant.

While specific embodiments of the invention have been shown and described in detail to illustrate the application of the principles of the invention, it will be understood that the invention may be embodied otherwise without departing from such principles

LIST OF REFERENCE NUMBERS

1 Plug-in connector
2 Connector part, upper part
3 Connector part, lower part
4 Front side
5 Hollow space
6 Hollow section
7 Sealant
8 Central axis, connection point
9 Middle wall, upper part
10 Side wall, upper part
11 Depression
12 Indentation
13 Free space
14 Hump
15 Middle wall, lower part
16 Side wall, lower part
17 Middle stop
18 Spring boss
19 Recess, cutout
20 Retaining element
21 Centering hole
22 Projection
23 Longitudinal axis of connector
24 Impression

What is claimed is:

1. A plug-in connector for insulating glass pane spacer frame hollow section, the plug-in connector comprising:

a first connector part with a first connector part middle wall, a first connector part first side wall and a first connector part second side wall, said first connector part first side wall extending from a first lateral side of said first connector part middle wall in a first direction and said first connector part second side wall extending from a second lateral side of said first connector part middle wall substantially in said first direction to form an essentially U-shaped cross section;

a second connector part with a second connector part middle wall, a second connector part first side wall and a second connector part second side wall, said second connector part first side wall extending from a first lateral side of said second connector part middle wall in a second direction and said second connector part second side wall extending from a second lateral side of said second connector part middle wall substantially in said second direction to form an essentially U-shaped cross section, said first connector part first side wall and said first connector part second side wall extending toward said second connector part middle wall within said second connector part first side wall and said second connector part second side wall to form a hollow space, said first connector part having an outside depression and formed in one or more of said first connector part first side wall and said first connector part second side wall extending inwardly in an area of a connection point of the spacer frame hollow sections to provide a free space between said one or more of said first connector part first side wall and said first connector part second side wall and the adjacent said second connector part first side wall and said second connector part second side wall.

2. A plug-in connector in accordance with claim 1, wherein each of said first connector part first side wall and said first connector part second side wall have a depression and a projection in contact with a respective adjacent said second connector part first side wall and said second connector part second side wall.

3. A plug-in connector in accordance with claim 1, wherein in an area of the connection point said second connector part has outwardly extending middle stops, each of said middle stops acting in a direction at side walls of adjacent hollow sections with at least two of said middle stops acting in opposite directions.

4. A plug-in connector in accordance with claim 1, wherein said second connector part has a recess at each of said second connector part first side wall and said second connector part second side wall, each recess being at edges of the side walls of hollow sections in an area of the connection point.

5. A plug-in connector in accordance with claim 1, wherein in an area of the connection point, said second connector part has outwardly extending middle stops, each of said middle stops acting in a direction at side walls of adjacent hollow sections with at least two of said middle stops acting in opposite directions, wherein said second connector part has a recess at each of said second connector part first side wall and said second connector part second side wall, each recess being at edges of the side walls of the hollow sections in the area of the connection point wherein each said recess is arranged opposite one of said middle stops.

6. A plug-in connector in accordance with claim 1, wherein said first connector part depression is formed in each of said first connector part first side wall, said first connector part second side wall and said first connector part middle wall, wherein said free space extends over three sides of said first connector part.

7. A plug-in connector in accordance claim 1, wherein said middle wall of one of said first connector part and second connector part with an elastic hump.

8. A plug-in connector in accordance with claim 1, wherein said first connector part and said second connector part form said hollow space with an open first front end and an open second end.

9. A plug-in connector in accordance with claim 1, wherein one of said first connector part and said second connector part has retaining elements.

10. A plug-in connector in accordance with claim 1, wherein in the area of the connection point said second connector part has outwardly extending middle stops, each of said middle stops acting in a direction at side walls of adjacent hollow sections with at least two of said middle stops acting in opposite directions and one of said first connector part and said second connector part has said retaining elements wherein said middle stops and said retaining elements are spring bosses.

11. A plug-in connector in accordance with claim 1, wherein each of said first connector part and said second connector part is made as a stamped and bent part from metal.

12. A plug-in connector for insulating glass pane spacer frame hollow sections, the plug-in connector comprising:

an inner connector part with an inner connector part middle wall, an inner connector part first side wall and an inner connector part second side wall, said inner connector part first side wall extending from a first lateral side of said inner connector part middle wall in a first direction and said inner connector part second side wall extending from a second lateral side of said inner connector part middle wall substantially in said first direction to form an essentially U-shaped cross section;

an outer connector part with an outer connector part middle wall, an outer connector part first side wall and an outer connector part second side wall, said outer connector part first side wall extending from a first lateral side of said outer connector part middle wall in a second direction and said outer connector part second side wall extending from a second lateral side of said outer connector part middle wall substantially in said second direction to form an essentially U-shaped cross section, said inner connector part first side wall and said inner connector part second side wall extending toward said outer connector part middle wall within said outer connector part first side wall and said outer connector part second side wall to form a hollows space, said inner connector part having an outside depression formed in one or more of said inner connector part first side wall and said inner connector part second side wall extending inwardly in an area of a connection point of the spacer frame hollow sections to provide a free space between said one or more of said inner connector part first side wall and said inner connector part second side wall and the adjacent said outer connector part first side wall and said outer connector part second side wall.

13. A plug-in connector in accordance with claim 12, wherein each of said inner connector part first side wall and said inner connector part second side wall have a depression and a projection in contact with a respective adjacent said outer connector part first side wall and said outer connector part second side wall.

14. A plug-in connector in accordance with claim 12, wherein said outside depression is formed in each of said inner connector part first side wall, said inner connector part second side wall and said inner connector part middle wall, wherein said free space extends over three sides of said inner connector part.

15. An insulating glass pane spacer frame hollow section and plug-in connector combination comprising;

a first insulating glass pane spacer frame hollow section;

a second insulating glass pane spacer frame hollow section said first hollow section and said second hollow section being adjacent at ends at a connection point;

an inner connector part with a middle wall and side walls extending respectively from a lateral side of said inner connector part middle wall to form an essentially U-shaped cross section;

an outer connector part with a middle wall and side walls extending respectively from a lateral side of said outer connector part middle wall to form an essentially U-shaped cross section, said inner connector part side walls extending to said outer connector part middle wall within said outer connector side walls to form a box shape connector with a hollow space, said inner connector part having an outside depression and formed in one or more of said inner connector part side walls and said inner part middle wall, said first insulating glass pane spacer frame hollow section extending inwardly in an area of a connection point of the hollow sections to provide a free space.

16. A plug-in connector combination in accordance with claim 15, wherein each of said side walls of said inner connection part has said depression and has projections at each side of each said depression, said projections being in contact with a respective adjacent hollow section interior side wall, each said depression extending in a direction substantially perpendicular to a longitudinal axis of said box shape connector.

17. A plug-in connector combination in accordance with claim 15, wherein said outside depression is formed in each of said inner connector side wall and said inner connector part middle wall, wherein said free space extends over three sides of said inner connector part.

18. A plug-in connector combination in accordance with claim 15, further comprising a sealant in said free space.

* * * * *